United States Patent [19]

Long

[11] 4,094,694

[45] June 13, 1978

[54] WATER-RESISTANT GYPSUM COMPOSITION AND PRODUCTS, AND PROCESS OF MAKING SAME

[75] Inventor: William J. Long, Chicago, Ill.

[73] Assignee: United States Gypsum Company, Chicago, Ill.

[21] Appl. No.: 796,926

[22] Filed: May 16, 1977

Related U.S. Application Data

[63] Continuation of Ser. No. 669,945, Mar. 24, 1976, abandoned.

[51] Int. Cl.$^2$ .............................................. C04B 11/14
[52] U.S. Cl. .................................. 106/111; 106/116; 260/28.5 R; 260/28.5 AS
[58] Field of Search .................. 106/90, 94, 96, 111, 106/116, 314; 260/28.5 R, 28.5 AS

[56] References Cited

U.S. PATENT DOCUMENTS

| | | | |
|---|---|---|---|
| 1,658,605 | 2/1928 | Liebich | 106/111 |
| 2,198,776 | 4/1940 | King et al. | 106/95 |
| 3,520,708 | 7/1970 | Chambers et al. | 106/111 |
| 3,645,763 | 2/1972 | Ronzio et al. | 106/314 |
| 3,753,748 | 8/1973 | Martin | 106/90 |
| 3,867,161 | 2/1975 | Torii et al. | 106/96 |
| 3,935,021 | 1/1976 | Greve et al. | 106/111 |

*Primary Examiner*—L. Dewayne Rutledge
*Assistant Examiner*—John P. Sheehan
*Attorney, Agent, or Firm*—Samuel Kurlandsky; Robert H. Robinson; Kenneth E. Roberts

[57] ABSTRACT

An improved water-resistant cementitious composition and products made therefrom are provided by forming an aqueous cementitious slurry, as for example of calcined gypsum and adding to the slurry a composition in the form an aqueous emulsion of asphalt and wax, a minor proportion of polyvinyl alcohol and a minor proportion of a borate compound, that is, one having an anion comprising boron and oxygen, as for example borax. The slurry is set in conventional manner by heating and drying. The resulting product has a high degree of water-resistance while utilizing less asphalt and wax composition than required with conventional asphalt-wax emulsions thereby accomplishing a large savings in raw material costs. Additionally, the use of a small amount of the borate compound permits a smaller amount of the relatively expensive polyvinyl alcohol to be used without a reduction in the water-resistance of the final product. Alternatively, an amount of asphalt and wax composition may be utilized equal to or greater than that conventionally used, but obtaining a much greater degree of water-resistance.

44 Claims, No Drawings

WATER-RESISTANT GYPSUM COMPOSITION AND PRODUCTS, AND PROCESS OF MAKING SAME

This is a continuation of application Ser. No. 669,945, filed Mar. 24, 1976, now abandoned.

BACKGROUND OF THE INVENTION (1) Field of Invention

The present invention relates to cementitious compositions, and more particularly refers to a gypsum composition having a higher degree of water-resistance than has been obtained in the prior art.

(2) Description of the Prior Art

Regular gypsum wallboard and similar products have very little resistance to water. When ordinary gypsum wallboard is immersed in water at room temperature, for example, 70° F., the lack of water resistance is readily demonstrated by the fact that in a short time the gypsum core has absorbed a considerable amount of water. Actual tests have demonstrated that when a 2×2×2 inch cube of gypsum board core material is immersed in water at about 70° F., the material shows a water absorption of greater than 60% after having been immersed for 5 minutes. Many attempts have been made in the past to improve the water resistance of gypsum products. These attempts included the incorporation of water-resistant materials such as metallic soaps, asphalts, waxes, resins, etc., within the wet calcium sulfate mixture. They have also included attempts to coat the finished gypsum board with water-resistant films or coatings.

One example of past attempts to waterproof gypsum products integrally by the addition of water-repellent substances is that disclosed in the King and Camp U.S. Pat. No. 2,198,776. This disclosure teaches the incorporation of paraffin wax, asphalt, or other fusible water-insoluble organic substances into a gypsum mix by first melting this waxy material and then dispersing such material into the wet gypsum mix by spraying the hot molten mass into the aqueous gypsum dispersion. This brings about a formation of finely dispersed solidified paraffin or asphalt particles which then serve to improve the water resistance of the gypsum product. While these past efforts resulted in some degree of success, there has been no waterproofing process developed in the past which was capable of causing a drastic increase in water-resistance by the use of only a comparatively very small amount of cheap waterproofing materials.

Camp U.S. Pat. No. 2,432,963 discloses that if a mixture of paraffin wax and asphalt, in definite proportions, say on the order of from about 5% to about 15% (dry basis), is incorporated in the form of an emulsion with a wet plastic gypsum mass, the finished dried gypsum wallboard will possess a degree of water resistance which is greatly out of proportion to the degree of water resistance obtained if one uses these same paraffin wax and asphalt materials witout emulsification. The degree of water-resistance obtained by the use of a mixture of paraffin wax and asphalt in certain proportions is very much greater than that obtained when one uses either the wax alone or the asphalt alone in emulsified form. Camp U.S. Pat. No. 2,526,537 has disclosed a water-resistant gypsum product having added therein a composition of asphalt, paraffin wax and potassium sulfate.

Camp U.S. Pat. No. 2,526,538 discloses a water-resistant product comprising gypsum and a composition of asphalt, paraffin wax and a substance selected from the group consisting of alkali and alkaline earth aluminates and Portland cement.

Selbe U.S. Pat. No. 2,669,414 discloses a water-resistant gypsum composition formed by adding to a gypsum slurry a blend of oil-soluble alkali salt of mahogany sulfonic acid with asphalt and paraffin wax.

In "The Elvasize Process" published by the du Pont Company there is described a method for first coating polyvinyl alcohol on paper and then adding borax to control the penetration of the polyvinyl alcohol size into the paper. However, the process described is for sizing paper and not for preparing water-resistant gypsum board.

U.S. Pat. No. 3,853,689 teaches that the sag resistance of gypsum board is improved by incorporating a small amount of polyvinyl alcohol in the gypsum core of the board.

U.S. Pat. No. 3,935,021 teaches that the water resistance of gypsum products such as gypsum wallboard is improved by incorporating into the composition from which the gypsum product is made a combination of polyvinyl alcohol and asphalt-wax emulsion. However, the patent teaches that at least 0.15 weight percent of polyvinyl alcohol must be utilized in order to obtain acceptable results. Since the cost of polyvinyl alcohol is substantial, economic considerations represent a formidable block to the commercialization of this patented product. In evaluating the prior art discussed above, it is clear that many of the compositions yield products having good water-resistant properties, but that the cost of the materials is undesirably high and that a less expensive means of rendering gypsum board water-resistant would be highly desirable to obtain a competitive advantage in the market. Further, the incorporation of abnormally high amounts of materials such as asphalt and wax to obtain an even higher degree of water resistance may have deleterious effects on the properties of the finished product.

SUMMARY OF THE INVENTION

It is accordingly an object of the present invention to provide a waterproofing composition which, when added to a settable cementitious aqueous slurry such as an aqueous calcined gypsum slurry, and formed into products such as gypsum board, results in a product having a high degree of water-resistance.

It is a further object of the invention to provide a composition for adding to a gypsum slurry to form gypsum wallboard which has a higher degree of water-resistance.

It is still further an object to provide a composition for rendering gypsum wallboard water-resistant which can utilize a smaller amount of composition, and thereby accomplishing an economy in wallboard cost while still providing the same degree of water-resistance as provided by prior art compositions.

Still other objects and advantages will readily present themselves to one skilled in the art upon reference to the following specification and claims.

DESCRIPTION OF THE PREFERRED EMBODIMENTS

According to the invention it has been discovered that gypsum wallboard of enhanced water-resistance and capable of being produced at a lower raw material cost can be provided by introducing into the calcined gypsum slurry utilized to produce the gypsum wallboard a composition comprising asphalt, wax, a minor proportion of polyvinyl alcohol, and a minor proportion of a compound containing a borate anion, that is, an anion of boron and oxygen. It has been further found that the borate compound cooperates synergistically with the polyvinyl alcohol, asphalt and wax to permit a smaller amount of polyvinyl alcohol to be utilized with the asphalt and wax emulsion to obtain a wallboard product having excellent water resistance at a lower cost than is possible without the use of the borate compound. It has been further found that the use of the combination of the borate compound and polyvinyl alcohol permits a smaller amount of asphalt and wax to be utilized while still maintaining a high degree of water resistance. Alternatively, by increasing the amounts of the borate compound and polyvinyl alcohol, higher degrees of water resistance can be obtained in the gypsum wallboard formed. It has been further found that the incorporation of the borate compound permits the amount of expensive polyvinyl alcohol utilized to be reduced to an exceptionally low value which the prior art teaches is not sufficient to obtain gypsum wallboard with satisfactory water resistance. The above-described conditions obtain in spite of the fact that both the borate compound and polyvinyl alcohol in themselves appear to provide no water-resistant properties in finished wallboard.

It has been found that all polyvinyl alcohol commercial materials perform satisfactorily in the present invention, and that the degree of water-resistance obtained is dependent largely on the percent of hydrolysis of the polyvinyl alcohol. Consequently, super-hydrolyzed grades have proven superior in their action of enhancing the waterproofing properties of standard wax and asphalt emulsions when introduced into a gypsum slurry to form gypsum products. A particularly suitable material is the polyvinyl alcohol manufactured by Air Products and Chemicals and marketed under the trademark Vinol 125. This material which is in dry form is preferably added to either the asphalt-wax emulsion or the slurry water at the board plant in aqueous solution form. It has been found that no changes are necessary in the manufacturing procedure of making water-resistant gypsum board when polyvinyl alcohol additions are made, since the material has no adverse effects on boardmaking.

As used herein, the terms "borate" and "borate compound" are utilized to designate compounds having an anion composed of boron and oxygen. The cation may be any of the commonly known cations combined with borates such as sodium, potassium, ammonium, or hydrogen. Compounds having somewhat unstable cations such as ammonium provide operable compositions, but are not as satisfactory as those having the more stable cations such as sodium, potassium or hydrogen. Among the compounds which may be used are sodium or potassium tetraborate, either as the decahydrate or in anhydrous form, sodium or potassium metaborate, ammonium, sodium, or potassium pentaborate, ammonium, sodium or potassium biborate, sodium or potassium pentaborate, or boric acid. The borate compound may be introduced together with the asphalt-wax emulsion, or may be added separately with the make-up water for the gypsum slurry.

It has been found that exceptionally high water-resistant gypsum board may be prepared by adding as little as 0.3 pounds borax with one pound of Vinol 125 in combination with 10 gallons of asphalt-wax emulsion (55% solids) per 1,000 square feet of wallboard at a board weight of about 1,800 pounds. Without the borax and Vinol 125 addition it is conventionally necessary to utilize 20 pounds of asphalt-wax emulsion to obtain the same degree of water resistance. As can be seen the small addition of borax and Vinol 125 achieves a material saving, since the asphalt-wax emulsion costs about 60 cents per gallon, and since the Vinol 125 costs only 60 cents per pound and the borax only 6–7 cents per pound. It can be further seen that the small addition of borax costing only 6–7 cents per pound permits less than half of the more expensive polyvinyl alcohol to be utilized while attaining excellent water resistance, thereby accomplishing a further savings. It has been further found that when the polyvinyl alcohol and borate compound are utilized it is possible to eliminate some or all of the starch normally utilized for bonding the paper cover sheets to the gypsum core.

Gypsum wallboard is generally made by depositing a plastic gypsum mass or slurry between fibrous liners, pressing the mass to a desired thickness by means of rollers, allowing the gypsum to set and harden before cutting the formed gypsum board, and finally passing the formed gypsum board through a dryer to remove excess moisture. Light-weight gypsum board is the product obtained by incorporating an aerated foam with the gypsum, thereby causing the production of air spaces in the gypsum mass, with resultant lightening of the finished gypsum board.

SPECIFIC EXAMPLES

The following examples represent a series of both laboratory experiments and factory mill runs which demonstrate the advantages of the composition of the invention. The examples are to be considered for the purpose of teaching how to practice the invention, and not for the purpose of limitation.

In all the immediate examples which follow, an asphalt-wax emulsion was utilized, having borax added thereto and containing 56% solids by weight and having the general formulation shown below in Table I:

TABLE I

| INGREDIENTS | PARTS BY WEIGHT |
|---|---|
| asphalt | 225 |
| wax | 45 |
| borax (sodium tetraborate decahydrate) | 1 |
| water | 213 |
| emulsifying and dispersing agent | 29 |

The wax utilized may be crude scale wax or paraffin. Other waxes may be used but are considerably more expensive.

In testing the water-resistant properties of gypsum products made with the water-resistant materials of the inventor, a standard gypsum slurry was utilized having the formulation shown below in Table II:

TABLE II

| stucco (calcium sulfate hemihydrate) | 600 | g |
|---|---|---|
| water | 500 | cc |
| ground gypsum catalyst containing 5% sugar | 1.3 | g |
| potassium sulfate | 0.6 | g |
| rosin soap (15% active) | 1.5 | cc |

Mixing and Vicat times were 1 and 5 minutes, respectively.

To test the products for water resistance each test cube, 2×2×2 inches, was formed from mix, dried for 55 minutes at 340° F. to approximately 70% of its wet weight, and then heated 16 hours at 110° F. to a constant weight. After further conditioning for 24 hours at 70° F., 50RH, the test cubes were totally immersed in water with a one inch head in a circulating water bath at 70° F. water temperature, for the indicated times.

Table III below lists the compositions utilized in Examples 1–6 and the results of the water-resistance test obtained by testing samples of the products by the test described above:

TABLE III

| Example | Asphalt-Wax Emulsion Containing Borax (Table I) [56% solids] | Polyvinyl Alcohol (10% aqueous solution) | Gypsum Slurry (Table II) | 1-Hour Absorption % Water Pickup | 2-Hour Absorption % Water Pickup |
|---|---|---|---|---|---|
| 1 (Comparative) | 40cc. | 0 | 1103.4g | 19.0% | 50+ |
| 2 (Comparative) | 80cc. | 0 | 1103.4g | 3.4 | 5.7 |
| 3 | 40cc. | 0.4cc Vinol 205 | 1103.4g | 2.8 | 5.4 |
| 4 | 40cc. | 0.4 cc Vinol 125 | 1103.4g | 2.6 | 2.7 |
| 5 (Comparative) | 0 | 0.4cc Vinol 125 | 1103.4g | 50+ | 50+ |
| 6 (Comparative) | 0 | 2.0cc Vinol 125 | 1103.4g | 50+ | 50+ |

Referring to the Table III above, Example 1 is a comparative example showing a product in which 40cc of borax-containing asphalt-wax emulsion was utilized with the gypsum slurry composition described above, and samples tested in the testing procedure described above. The samples exhibited unacceptably high water absorption, 19% in the one hour and above 50% in the two hour test.

Example 2 is a comparative example in which 80cc of borax-containing asphalt-wax emulsion was added to the standard slurry and tested. The product exhibited good water-resistant properties, only 3.4% absorption in one hour and only 5.7% in two hours. This is the best prior art composition now available.

Example 3 is a composition according to the present invention in which only 40cc borax-containing asphalt-wax emulsion with 0.4cc Vinol 205 was utilized with the standard gypsum slurry. The tested product exhibited excellent water-resistant properties, having a 2.8% absorption in one hour and a 5.4% absorption in two hours. It should be noted that although only half as much of the asphalt-wax emulsion was utilized in Example 3 as was utilized in Example 2, the water-resistant properties of the product of Example 3 were even better. Since only a small amount of polyvinyl alcohol and borax are utilized, the saving in cost by utilizing only one-half of the amount of asphalt-wax emulsion is considerable. The saving is further increased because, since borax is utilized, the amount of relatively expensive polyvinyl alcohol can be reduced. The results obtained are particularly surprising in view of the fact that utilizing only 40cc of asphalt-wax emulsion without polyvinyl alcohol in Example 1 resulted in a wholly unacceptable product.

In Example 4, the proportions of ingredients utilized were the same as in Example 3, but the polyvinyl alcohol utilized was Vinol 125 instead of Vinol 205. The results in this case were even better than those obtained with the product of Example 3, 2.6% absorption in one hour and 2.7% absorption in two hours.

The experiments of Examples 5 and 6 were carried out to determine whether the results obtained by adding the extremely small amounts of polyvinyl alcohol and borax are synergistic, or are merely the cumulative result of the properties of the polyvinyl alcohol and borated asphalt-wax emulsion. In both Examples 5 and 6 polyvinyl alcohol was utilized in the absence of the asphalt-wax emulsion and borax. In both cases the test samples exhibited greater than 50% absorption both in the one hour test and the two hour test, clearly indicating that the polyvinyl alcohol in itself provides absolutely no water-resistant properties when used with gypsum. Although the tests showed that the use of 0.4cc of polyvinyl alcohol at 10% solids contributed absolutely nothing to the water-resistant properties of the final samples, the tests show that when the same 0.4c of polyvinyl alcohol is utilized in combination with borated asphalt-wax emulsion, it can replace as much as 40cc of asphalt-wax emulsion while still obtaining a superior product. The results can lead to no other conclusion but that the coaction of polyvinyl alcohol with borax and asphalt-wax emulsion is a synergistic one.

MILL RUNS

Mill runs were made of the present invention for producing a gypsum wallboard product sufficiently resistant to water to be used for exterior construction of buildings as well as interior areas exposed to water and water vapor. Each test was made utilizing a standard formulation of gypsum slurry as set out below in Table IV, each batch resulting in about 1850 pounds of gypsum product when dried:

TABLE IV

| | |
|---|---|
| Stucco (calcium sulfate hemihydrate) | 1400 lb. |
| water | 1600 lb. |
| calcium sulfate dihydrate | 4 lb. |
| potassium sulfate | 2 lb. |
| rosin soap | less than 1 lb. |

The standard gypsum core treatment formulation normally requires 18–21 gallons of asphalt-wax emulsion (56% solids) to produce a finished product on one-half inch of thickness and 1850 pounds per thousand square feet of board. In Table V below, Examples 7 and 8 represent comparative examples formulated with asphalt-wax emulsion in combination with borax but without polyvinyl alcohol, while Example 9 is a composition according to the invention utilizing polyvinyl alcohol in addition to the asphalt-wax and borax emulsion. In each case the materials were added to a standard gypsum emulsion of the ingredient amounts shown in Table IV.

TABLE V

| | | Water-resistance tests | | | |
|---|---|---|---|---|---|
| Example | Asphalt-Wax Emulsion (Table I) | Polyvinyl Alcohol (10% aqueous solution) (Vinol 125) | Gypsum Slurry (Table IV) | 1-Hour Absorption % Water Pickup | 2-Hour Absorption % Water Pickup |
| 7 (Comparative) | 21 gal. | 0 | 2566 lb. | 4.9% | 5.8% |
| 8 (Comparative) | 15 gal. | 0 | 2566 lb. | 8.9% | 25.4% |
| 9 | 10 gal. | 1.5 | 2566 lb. | 4.2% | 4.8% |

The results of Table V above show the outstanding water-resistant properties which are obtained by treating gypsum slurry with a mixture of polyvinyl alcohol and borax-containing asphalt-wax emulsion. The composition according to the invention formed by incorporating only ten gallons (83 pounds) of borated asphalt-wax emulsion together with only 1.5 pound solids of Vinol 125 produced even superior water-resistant properties than those of the product formed with 21 gallons (174 pounds) of borated asphalt-wax in the absence of Vinol 125. This indicates that 1.5 pounds of polyvinyl alcohol (Vinol 125) functions as a complete substitution for 91 pounds of asphalt-wax emulsion when used together with borax.

In order to study the effect of various concentrations of polyvinyl alcohol in relation to borax-containing asphalt-wax emulsion, Experiments 10–18 listed in Table VI below were carried out. In each case, ten gallons of borax-containing asphalt-wax emulsion of Table I were used with standard gypsum slurry of Table IV to form dry gypsum board of a density of 1850 pounds per thousand square feet of board.

sion of the paper cover sheets to the gypsum core utilized in forming the gypsum board.

The commercial polyvinyl alcohol materials utilized in making the product of the present invention and described below were manufactured by Air Products and Chemicals, Inc., of Wayne, Pa. The products are formed by hydrolyzing polyvinyl acetate to various degrees of hydrolysis. Products of other manufacturers may be used. The super hydrolyzed grades have proved superior in their action of improving the water-resistant or waterproofing properties of standard wax and asphalt emulsions when introduced into the gypsum slurry to form gypsum wallboard. The various grades of polyvinyl alcohol and degrees of hydrolysis used herein are as follows:

| POLYVINYL ALCOHOL | PERCENT HYDROLYSIS |
|---|---|
| Vinol 107 | 98–98.9% |
| Vinol 125 | 99.7% minimum |
| Vinol 205 | 87–98% |
| Vinol 325 | 98–98.8% |
| Vinol 425 | 95.5–96.5% |

TABLE VI

| | | Water-resistance tests | | | |
|---|---|---|---|---|---|
| Example | Asphalt-Wax Emulsion Containing Borax [56% solids] | Polyvinyl Alcohol (Dry solids) (Vinol 125) | Gypsum Slurry (Table IV) | 1-Hour Absorption % Water Pickup | 2-Hour Absorption % Water Pickup |
| 10 (Comparative) | 10 gal. | 0 | 2566 lb. | 24.0 | 50+ |
| 11 (Comparative) | 20 gal. | 0 | 2566 lb. | 2.8 | 4.8 |
| 12 | 10 gal. | 0.5 lb. | 2566 lb. | 9.0 | 11.2 |
| 13 | 10 gal. | 1.0 lb. | 2566 lb. | 2.5 | 4.6 |
| 14 | 10 gal. | 2.0 lb. | 2566 lb. | 2.2 | 3.2 |
| 15 | 10 gal. | 4.0 lb. | 2566 lb. | 2.2 | 3.4 |
| 16 | 20 gal. | 1.0 lb. | 2566 lb. | 2.3 | 3.4 |
| 17 | 5 gal. | 1.0 lb. | 2566 lb. | 17.0 | 25 |
| 18 | 5 gal. | 4.0 lb. | 2566 lb. | 11.0 | 15 |

As can be seen in comparative Example 10 above wherein no polyvinyl alcohol was used, unacceptable results were obtained even in the presence of borax. Example 12 utilizing 0.5 pounds of Vinol 125 gave somewhat better results. One pound of Vinol 125 with borax in Example 13 gave excellent results and two pounds in Example 14 gave superior results. As shown by the remaining examples, increasingly good results can be obtained by utilizing as much as four pounds of polyvinyl alcohol per ten gallons of asphalt-wax emulsion. Compositions having greater than four pounds of polyvinyl alcohol per ten gallons asphalt-wax emulsion may be utilized up to about 20 gallons, but the finished product becomes unacceptably expensive. Additionally when the amount used is above 20 gallons, the properties of the finished gypsum product may be adversely affected.

It has been found that the addition of polyvinyl alcohol to the asphalt-wax slurry containing borax not only permits the use of a substantially smaller amount of emulsion, but also offers the benefit of promoting adhe- A preferred polyvinyl alcohol is formed of polyvinyl acetate hydrolyzed to a degree of from about 97% to greater than about 99%.

Any form of asphalt may be utilized in practicing the present invention. However, the preferred asphalts are those derived from petroleum residues, having a ring-and-ball softening point of about 110° F.

The wax may be any natural or synthetic wax disclosed in the prior art, as for example crude scale wax, paraffin, ceresin, carnauba, microcrystaline, montan, candelilla, polyethelene wax, and many others commonly available. Of the foregoing waxes paraffin is the preferred.

The cementitious compositions which may be utilized with the emulsion of the present invention are gypsum in the form of stucco (calcium sulfate hemihydrate), cement, and other settable cementitious materials.

The proportion of the asphalt and wax to the cementitious material such as gypsum should be in the range of from about 2% to about 15% by weight on a dry solids content basis. The proportion of asphalt to wax should be in the range of from about one part to about ten parts asphalt for each part of wax, by weight on dry solids content basis. A preferred ratio of asphalt to wax is from about 4.8:1 to about 5.2:1 by weight. The polyvinyl alcohol should be present in an amount at least about 0.016% dry solids of the final cementitious material by weight of the total or about 1.0 percent based on 55% asphalt-wax emulsion. The maximum proportion of polyvinyl alcohol to asphalt-wax dry contents is not critical. It has been found that a good practical proportion is one pound solid polyvinyl alcohol to ten gallons of asphalt-wax slurry of 55% solids, or 2.2% by weight based on dry solids content. Greater concentrations may be used, but cost becomes a limiting factor. Compositions have been made utilizing four pounds dry weight polyvinyl alcohol with ten gallons standard asphalt-wax emulsion. When mixed with standard gypsum slurry this provides an excellent gypsum product which at 72 hours absorbed only 11.2% water by weight. Four pounds per ten gallons is equivalent to 8.5% polyvinyl alcohol based on asphalt-wax dry solids content. A further experiment was carried out utilizing asphalt-wax emulsion and the polyvinyl alcohol solution may be added separately to the gypsum slurry.

In U.S. Pat. No. 3,935,021, discussed above, the advantages of using polyvinyl alcohol with asphalt-wax emulsion are disclosed. However, the results of the tests reported in the subject patent show that when less than 0.15 wt. percent of polyvinyl alcohol is utilized, based on gypsum board dry weight, the water-resistant properties of the finished gypsum board are unsatisfactory. It is an important finding of the present invention that the addition of a minor proportion of a borate compound together with the polyvinyl alcohol and asphalt-wax emulsion permits amounts of polyvinyl alcohol substantially less than 0.15 wt. percent to be used while still obtaining excellent water-resistant properties. In order to demonstrate this unexpected finding, a series of tests were carried out following as closely as possible the procedure and compositions disclosed in the subject patent U.S. Pat. No. 3,935,021. The results of the experiments are reported as Examples 19-28 in Table VII below. The results reported in the subject patent are set out as Examples 29-31 in the same Table VII.

TABLE VII

| Example | wt. % of Polyvinyl Alcohol | wt. % of Borax | wt. % of Asphalt-wax Emulsion | 1-Hour Absorption % Water Pickup | 2-Hour Absorption % Water Pickup |
|---|---|---|---|---|---|
| 19 | None | None | None | 63.4 | 62.2 |
| 20 | 1.0 | None | None | 63.0 | 62.5 |
| 21 | 1.0 | 0.5 | None | 55.0 | 61.0 |
| 22 | None | None | 3 | 44.0 | 56.0 |
| 23 | None | None | 5 | 30.0 | 46.0 |
| 24 | 0.05 | None | 5 | 33.0 | 48.0 |
| 25 | 0.05 | 0.015 | 5 | 3.3 | 4.2 |
| 26 | 0.05 | 0.025 | 5 | 2.7 | 3.3 |
| 27 | 0.05 | 0.05 | 5 | 2.4 | 2.7 |
| 28 | 0.20 | None | 5 | 2.1 | 2.8 |
| 29 | 0.05 | — | 5.0 | — | 44.9 |
| 30 | 0.10 | — | 3.0 | — | 46.0 |
| 31 | 0.20 | — | 5.0 | — | 3.8 |

20 pounds dry weight polyvinyl alcohol with ten gallons standard asphalt-wax emulsion. When mixed with standard gypsum slurry and hardened an exceptionally high water-resistant product was obtained which in a 72 hour absorption test absorbed only 3.4% water. On a dry solids basis this represents a composition having 43% by weight polyvinyl alcohol to asphalt-wax on a dry solids basis. Compositions utilizing 50% polyvinyl alcohol can also be made and provide excellent products, but the expense becomes too great for commercial use. Moreover, when amounts of polyvinyl alcohol greater than 50% are utilized, there is danger that the material may interfere with the properties of the final gypsum product.

The asphalt-wax emulsion may be prepared by any of known methods for making such emulsions. Generally the ingredients are mixed together in water with suitable emulsifying agents in conjunction with or as a replacement for proteans, such as soaps, various wetting agents such as the sulfated fatty alcohols, amine soaps, ether-alcohols, substituted sulfanates, various starches and extra materials, and the like, as will be obvious to those skilled in the art of emulsions. The polyvinyl alcohol component is incorporated into the asphalt-wax emulsion by first dissolving the solid alcohol particles in water, preferably at elevated temperature, at a suitable concentration such as 10%. If desired, some of the make-up water which is ultimately to be added to the gypsum slurry may be utilized for dissolving the polyvinyl alcohol. The dissolved material may then be added to the asphalt-wax emulsion, and the total composition then added to the gypsum slurry. Alternatively the In carrying out the tests reported as Examples 19-28, a gypsum slurry was prepared having a composition substantially that disclosed in the Examples of the subject patent. A major proportion of calcined gypsum, about 0.4 wt. percent potassium sulfate, about 0.3 to about 0.7 wt. percent dihydrate gypsum, and sufficient water to form a slurry were mixed together. A standard 55% solids asphalt-wax emulsion was used as disclosed in Table I with the borax added as a water solution in the amounts shown in Table VII. The mixed composition was formed into cubes by pouring the slurry into brass molds having dimensions 2×2×2 inches. The setting time was approximately six minutes. The cubes were then removed from the molds, heated for 50 minutes at 320° F., and oven-dried to a constant weight at 110° F. The dry weights of the cubes were determined after a cooling period of 90 minutes. The test cubes were then immersed in water with a one inch head at 70° F. for one and two hours. After removing the samples from the water, the percent water absorption was calculated by subtracting the dry weight from the wet weight, divided by dry weight times 100. The asphalt-wax emulsion used was approximately 55 weight percent solids of which 42.5 wt. percent was asphalt and 8.5% paraffin wax. The polyvinyl alcohol used was Air Products and Chemicals Vinol 125. The polyvinyl alcohol was added to the slurry composition in the form of a 5 wt. percent solution obtained after heating to a temperature of 180° F. The borate compound used was borax marketed by U.S. Borax as a technical grade granular sodium tetraborate decahydrate. Prior to using, the borax was first dissolved in water. In the examples illustrating compositions containing both polyvinyl alcohol and asphalt-wax emulsion, both were combined together and then added to the gypsum gauging water. In the examples which contain all ingredients, borax, polyvinyl alcohol and asphalt-wax emulsion, the borax was first dissolved in the gauging water and then followed with the addition of the polyvinyl alcohol and asphalt-wax blends.

As used in Table VII and in the discussion related thereto, the term weight percent is given the same definition as set out in the subject patent referred to above, that is, the weight percent based on the total weight of the composition ingredients, the ingredients including the water of the asphalt-wax emulsion, but not including the gauging water added to the gypsum composition for forming an aqueous slurry.

As shown in Examples 19–21, where the asphalt-wax emulsion was omitted, the results were not satisfactory, even when large amounts of polyvinyl alcohol or borax were added. Examples 22 and 23 show that where asphalt-wax emulsion is utilized in amounts of 3 or 5 percent without the other two ingredients, the results are still unsatisfactory. Example 24 shows that a composition containing 0.05% polyvinyl alcohol and 5% asphalt-wax emulsion is still not satisfactory. In Example 25, with the addition of 0.015% borax, the water-resistant property greatly improved and resulted in a composition which could be utilized for all purposes where high water-resistance is required. In Example 26, with the increase of the borax to 0.025%, with only 5% asphalt-wax emulsion, and with only 0.05% polyvinyl alcohol, an excellent compound was obtained absorbing only 3.3% water in the two hour test. Further, when the borax was increased to 0.05%, an even better product was obtained even though only 0.05% polyvinyl alcohol was utilized. Example 28 shows a composition copied from the subject patent discussed above utilizing polyvinyl alcohol but no borax. Here an amount as great as 0.20 wt. percent polyvinyl alcohol was required in order to obtain a satisfactory composition.

Examples 29–31 were also copied from the data of Table I of the above-described subject patent, present Examples 29–31 corresponding to Examples 7–9 of Table I of the subject patent. As can be seen, the samples containing 0.05% and 0.10 wt. percent of polyvinyl alcohol resulted in unsatisfactory compositions, and it was not until a value of 0.20 was utilized that a satisfactory composition was obtained. This is to be compared to the excellent water-resistant properties obtained in gypsum board prepared according to the present invention with only 0.05% polyvinyl alcohol but with the additional incorporation of a small amount of borax.

Although borax is one of the most effective borate compounds useful in practicing the invention, other borates may be used and are enumerated above. Table VIII below shows the results of experiments carried out utilizing other borate compounds.

TABLE VIII

| Ex. | wt. % of Polyvinyl Alcohol | wt. % of Borax | wt. % of Asphalt-Wax Emulsion | 2-Hour Absorption % Water Pickup |
|---|---|---|---|---|
| 32 | None | 0.01 Borax | 5.0 | 40.3 |
| 33 | .05 | None | 5.0 | 36.2 |
| 34 | .05 | 0.01 Borax | 5.0 | 5.4 |
| 35 | .05 | 0.01 Boric Acid | 5.0 | 4.4 |

TABLE VIII-continued

| Ex. | wt. % of Polyvinyl Alcohol | wt. % of Borax | wt. % of Asphalt-Wax Emulsion | 2-Hour Absorption % Water Pickup |
|---|---|---|---|---|
| 36 | .05 | 0.01 Sodium Pentaborate | 5.0 | 2.6 |

As can be seen in Table VIII above, boric acid and sodium pentaborate give results equally as good as borax. In fact, the use of sodium pentaborate provided a material which had even higher water resistance than borax. Other borate compounds such as those named above may also be used.

In order to determine the minimum permissible limitations for the various ingredients of the composition of the present invention, a series of experiments was carried out and the results reported as Examples 37–45, shown below in Table IX.

TABLE IX

| Ex. | wt. % of Asphalt-Wax Emulsion | Vinol 125 wt. % | wt. % of Borax | 2-Hour Absorption % Water Pick-up |
|---|---|---|---|---|
| 37 | 5 | .066 | .05 | 2.7 |
| 38 | 5 | .05 | .05 | 2.4 |
| 39 | 5 | .033 | .05 | 7.4 |
| 40 | 5 | .015 | .05 | 9.0 |
| 41 | 5 | None | None | 43.0 |
| 42 | 4 | .13 | .05 | 4.2 |
| 43 | 4 | .13 | .025 | 4.6 |
| 44 | 5 | .10 | .004 | 7.8 |
| 45 | 5 | .10 | .016 | 3.8 |
| 46 | 3 | .13 | .05 | 10.9 |

In Examples 37–40 the asphalt-wax emulsion was maintained constant at 5% and borax (sodium tetraborate decahydrate) was maintained constant at 0.05 wt. percent, while the wt. percent of Vinol 125 was varied from 0.066% to 0.015%. As can be seen, the Vinol 125 proportions of Examples 37 and 38 produced gypsum board having excellent water resistance. In Example 39 0.033 wt. percent Vinol 125 produced a gypsum board having somewhat poorer water resistance, although still usable for many purposes. Example 40 having a Vinol 125 content of 0.015 wt. percent represents about the minimum usable proportion at 9.0% water absorption.

Examples 41–45 illustrate tests made with varying degrees of borax while maintaining the Vinol 125 at a value less than 0.15 wt. percent, the minimum amount disclosed by the patent discussed above as being required to produce acceptable water resistance in gypsum board. The asphalt-wax emulsion was maintained at 4–5%. In Example 41, no Vinol 125 and no borax were used, resulting in an unacceptable value for water absorption. In Example 42 only 4% asphalt-wax emulsion was used together with 0.13 wt. percent Vinol 125. However, by incorporating only 0.05 wt. percent borax an excellent water resistance value of 4.2 was obtained. Even when the borax amount was reduced to one-half of the previous value, an excellent water absorption figure of 4.6% was obtained. In Example 44 0.10 wt. percent Vinol 125 was used, an amount taught in the above discussed patent to be unacceptable. However, it still produced very good results when as little as 0.004 wt. percent of borax was introduced. Example 45 shows that an excellent material having only 3.8% water absorption can be obtained by utilizing as low as 0.10 Vinol 125 when a greater value, 0.016 wt. percent, of borax was utilized.

The minimum effective amount of the borate compounds, referring to Example 44, appears to be 0.004 wt. percent when borax is used. For the other borates values somewhat higher or lower may be used. Since the borax was utilized in the form of the decahydrate, the minimum amount of borax which may be utilized in terms of the anhydrous compound would appear to be about 0.002 wt. percent, based on total dry gypsum board weight. Such a composition will produce a board having a 2-hour water absorption of 7.8%, a value which, although not optimum, is still suitable for commercial use.

The present composition for rendering gypsum board water resistant and comprising asphalt-wax emulsion, a borate ion-containing compound and polyvinyl alcohol has a number of advantages over materials disclosed in the prior art. By using suitable proportions of a borate ion-containing compound, polyvinyl alcohol and asphalt-wax emulsion a degree of water-resistance can be obtained in the final set cementitious product which is greater than that obtainable with solely an asphalt-wax emulsion. For example, by incorporating an extremely small amount of borax and polyvinyl alcohol the amount of asphalt-wax emulsion can be reduced to half that normally used and the resultant gypsum board will still have water-resistant properties equal to those made with twice the amount of asphalt-wax emulsion in the absence of borax and polyvinyl alcohol. The borate ion-containing compound may be readily incorporated into the asphalt-wax slurry and the polyvinyl alcohol may be dissolved in water and added to the emulsion immediately before both are added to the slurry, or, alternatively may be added separately with the make-up water of the slurry. Alternatively both the borate ion-containing compound and the polyvinyl alcohol may be added to the make-up water of the slurry. The resultant cementitious products have a water resistance equal to or greater than that of the prior art materials and still are less expensive to produce.

It is to be understood that the invention is not to be limited to the exact details of operation or materials and described, as obvious modifications and equivalents will be apparent to one skilled in the art.

Invention is claimed as follows:

1. A water-resistant cementitious composition consisting essentially of a set mass of hydrated gypsum crystals, and a waterproofing composition, said waterproofing composition comprising asphalt and wax originally added as an emulsion, a borate-containing compound and polyvinyl alcohol, the dry weight percent of the total of said asphalt and said wax based on the dry weight of said cementitious composition being at least about 1.6%, said polyvinyl alcohol being present in an amount of at least 0.015 weight percent based on the dry weight of said cementitious composition, and said borate-containing compound being present in an amount effective to cooperate with said polyvinyl alcohol and said asphalt and wax to enhance the water-resistance of said cementitious composition.

2. A water-resistant composition according to claim 1, wherein said borate-containing compound is present in an amount of at least about 0.002 weight percent.

3. A water-resistant composition according to claim 2, wherein said borate-containing material is borax.

4. A water-resistant composition according to claim 2, wherein said polyvinyl alcohol is present in an amount of at least about 0.05 weight percent.

5. A water-resistant composition according to claim 2, wherein said polyvinyl alcohol is formed of polyvinyl acetate hydrolyzed to a degree of at least about 87%.

6. A water-resistant cementitious composition according to claim 2, wherein said polyvinyl alcohol is formed of polyvinyl acetate hydrolyzed to a degree greater than about 99%.

7. A water-resistant composition according to claim 2, wherein the proportion by weight of said asphalt to said wax is from about 1:1 to about 10:1 based on total dry solids.

8. A water-resistant composition according to claim 2, wherein the ratio of asphalt to wax is from about 4.8:1 to about 5.2:1 by weight.

9. A water-resistant composition according to claim 2, wherein the total amount of said waterproofing composition is no greater than about 15% by weight of said hydrated gypsum based on dry solids content.

10. A method for producing a set water-resistant cementitious composition which comprises admixing with an aqueous slurry consisting essentially of calcined gypsum a waterproofing composition, and setting said slurry, said waterproofing composition comprising an emulsion of asphalt and wax, a borate-containing compound and polyvinyl alcohol, the dry weight percent of the total of said asphalt and said wax based on dry weight of said cementitious composition being at least about 1.6%, said polyvinyl alcohol being present in an amount of at least about 0.015 weight percent based on the dry weight of said cementitious composition, and said borate-containing compound being present in an amount effective to cooperate with said polyvinyl alcohol and said asphalt and wax to enhance the water-resistance of said cementitious composition.

11. A method according to claim 10, wherein said borate-containing compound is present in an amount of at least about 0.002 weight percent.

12. A method according to claim 11, wherein said borate-containing material is borax.

13. A method according to claim 11, wherein said polyvinyl alcohol is present in an amount of at least about 0.05 weight percent.

14. A method according to claim 11, wherein said polyvinyl alcohol is formed of polyvinyl acetate hydrolyzed to a degree of at least about 87%.

15. A water-resistant cementitious composition according to claim 11, wherein said polyvinyl alcohol is formed of polyvinyl acetate hydrolyzed to a degree greater than about 99%.

16. A water-resistant composition according to claim 11, wherein the proportion by weight of said asphalt to said wax is from about 1:1 to about 10:1 based on total dry solids.

17. A water-resistant composition according to claim 11, wherein the ratio of asphalt to wax is from about 4.8:1 to about 5.2:1 by weight.

18. A water-resistant composition according to claim 11, wherein the total amount of said waterproofing composition is no greater than about 15% by weight of said hydrated gypsum based on dry solids content.

19. A cementitious slurry for forming a water-resistant cementitious composition, said slurry consisting essentially of an aqueous mixture of calcined gypsum crystals, and a waterproofing composition, said waterproofing composition comprising an aqueous emulsion of asphalt and wax, a borate-containing compound and polyvinyl alcohol, the dry weight percent of the total of said asphalt and said wax based on dry weight of said cementitious composition being at least about 1.6%, said polyvinyl alcohol being present in an amount of at least about 0.015 weight percent based on the dry weight of said cementitious composition, and said borate-containing compound being present in an amount effective to cooperate with said polyvinyl alcohol and said asphalt and wax to enhance the water-resistance of said cementitious composition.

20. A cementitious slurry according to claim 19, wherein said borate-containing compound is present in an amount of at least about 0.002 weight percent of the dried and set gypsum composition.

21. A cementitious slurry according to claim 20, wherein said borate-containing material is borax.

22. A cementitious slurry according to claim 20, wherein said polyvinyl alcohol is present in an amount of at least about 0.05 weight percent.

23. A cementitious slurry according to claim 20, wherein said polyvinyl alcohol is formed of polyvinyl acetate hydrolyzed to a degree of at least about 87%.

24. A cementitious slurry composition according to claim 20, wherein said polyvinyl alcohol is formed of polyvinyl acetate hydrolyzed to a degree greater than about 99%.

25. A cementitious slurry according to claim 20, wherein the proportion by weight of said asphalt to said wax is from about 1:1 to about 10:1 based on total dry solids.

26. A cementitious slurry according to claim 20 wherein the ratio of asphalt to wax is from about 4.8:1 to about 5.2:1 by weight.

27. A cementitious slurry according to claim 20, wherein the total amount of said waterproofing composition is no greater than about 15% by weight of said hydrated gypsum based on dry solids content.

28. A method for forming a cementitious slurry for setting to form a water-resistant cementitious composition, consisting essentially of forming a mixture of calcined gypsum crystals, and adding a waterproofing composition to said slurry, said waterproofing composition comprising an emulsion of asphalt and wax, a borate-containing compound and polyvinyl alcohol, the dry weight percent of the total of said asphalt and said wax being at least about 1.6% based on the dry weight of said cementitious composition, said polyvinyl alcohol being present in an amount of at least about 0.015 weight percent based on the dry weight of said cementitious composition, and said borate-containing compound being present in an amount effective to cooperate with said polyvinyl alcohol and said asphalt and wax to enhance the water-resistance of said cementitious composition.

29. A method according to claim 28, wherein said borate-containing compound is present in an amount of at least about 0.002 weight percent of the dry set gypsum composition.

30. A method according to claim 29, wherein said borate-containing material is borax.

31. A method according to claim 29, wherein said polyvinyl alcohol is present in an amount of at least about 0.05 weight percent.

32. A method according to claim 29, wherein said polyvinyl alcohol is formed of polyvinyl acetate hydrolyzed to a degree of from 97% to greater than about 99%.

33. A method composition according to claim 29, wherein said polyvinyl alcohol is formed of polyvinyl acetate hydrolyzed to a degree greater than about 99%.

34. A method according to claim 29, wherein the proportion by weight of said asphalt to said wax is from about 2:1 to about 10:1 based on total dry solids.

35. A method according to claim 29, wherein the ratio of asphalt to wax is from about 4.8:1 to about 5.2:11 by weight.

36. A method according to claim 29, wherein the total amount of said waterproofing composition is no greater than about 15% by weight of said hydrated gypsum based on dry solids content.

37. A method according to claim 11, wherein said asphalt and wax are first formed into an aqueous emulsion together with said borate-containing compound and said emulsion is then added to said slurry, and wherein said polyvinyl alcohol is separately added to said slurry.

38. A water-resistant composition according to claim 2, comprising gypsum wallboard.

39. A cementitious slurry according to claim 20, which is suitable for forming gypsum wallboard.

40. A method according to claim 29, wherein said asphalt and wax are first formed into an aqueous emulsion together with said borate-containing compound and said emulsion is then added to said slurry, and wherein said polyvinyl alcohol is separately added to said slurry.

41. A water resistant cementitious composition, as in claim 1, wherein said polyvinyl alcohol is present in an amount of from at least about 0.015 to about 0.13 weight percent, based on the dry weight of said cementitious composition, and said borate containing compound is present in an amount of at least about 0.002 weight percent based on te dry weight of said cementitious composition.

42. A method as in claim 11, wherein said polyvinyl alcohol is present in an amount of from at least about 0.015 to about 0.13 weight percent, based on the dry weight of said cementitious composition, and said borate containing compound is present in an amount of at least about 0.002 weight percent based on the dry weight of said cementitious composition.

43. A cementitious slurry, as in claim 19, wherein said polyvinyl alcohol is present in an amount of from at about 0.015 to about 0.13 weight percent, based on the dry weight of said cementitious composition, and said borate containing compound is present in an amount of at least about 0.002 weight percent based on the dry weight of said cementitious composition.

44. A method, as in claim 28, wherein said polyvinyl alcohol is present in an amount of from at least about 0.015 to about 0.13 weight percent, based on the dry weight of said cementitious composition, and said borate containing compound is present in an amount of at least about 0.002 weight percent based on the dry weight of said cementitious composition.

* * * * *

UNITED STATES PATENT AND TRADEMARK OFFICE
CERTIFICATE OF CORRECTION

PATENT NO. : 4,094,694
DATED : June 13, 1978
INVENTOR(S) : William J. Long

It is certified that error appears in the above-identified patent and that said Letters Patent are hereby corrected as shown below:

In the Specification:

Column 6, line 32, change "0.4c" to --0.4cc--

In the Claims:

Claim 26, line 29, insert after Claim 20 a comma, --,--.

Claim 33, line 5, delete word "composition".

Signed and Sealed this

Twenty-second Day of January 1980

[SEAL]

Attest:

SIDNEY A. DIAMOND

Attesting Officer

Commissioner of Patents and Trademarks